US012687291B2

(12) United States Patent
Hu

(10) Patent No.: US 12,687,291 B2
(45) Date of Patent: Jul. 21, 2026

(54) FAUCET BASE WITH A LIGHT-EMITTING LAMP AND FAUCET

(71) Applicant: CRANACH BATH AND KITCHEN LLC, Dallas, TX (US)

(72) Inventor: Qinglan Hu, Dallas, TX (US)

(73) Assignee: CRANACH BATH AND KITCHEN LLC, Dallas, TX (US)

( * ) Notice: Subject to any disclaimer, the term of this patent is extended or adjusted under 35 U.S.C. 154(b) by 0 days.

(21) Appl. No.: 19/367,165

(22) Filed: Oct. 23, 2025

(65) Prior Publication Data

US 2026/0126171 A1 May 7, 2026

(30) Foreign Application Priority Data

Nov. 1, 2024 (CN) ........................ 202422671208.8

(51) Int. Cl.
*F21V 33/00* (2006.01)
*E03C 1/04* (2006.01)
*F21Y 115/10* (2016.01)

(52) U.S. Cl.
CPC .............. *F21V 33/004* (2013.01); *E03C 1/04* (2013.01); *F21Y 2115/10* (2016.08)

(58) Field of Classification Search
CPC .. E03C 1/0404; E03C 2001/0415; E03C 1/04; F21Y 2115/00; F21Y 2115/10; F21Y 2115/15; F21Y 2115/20; F21Y 2115/30; F21V 33/004
See application file for complete search history.

(56) References Cited

U.S. PATENT DOCUMENTS 10,393,363 B2 * 8/2019 Weaver ................. F21V 7/0066
2004/0258567 A1 * 12/2004 Kokin ................... F21V 33/004 422/68.1
2006/0203470 A1 * 9/2006 Gautschi ............... E03C 1/0404 362/96
2015/0354186 A1 * 12/2015 Tseng .................... E03C 1/0404 4/678

FOREIGN PATENT DOCUMENTS

CN 210770358 U 6/2020

* cited by examiner

*Primary Examiner* — Robert J May
(74) *Attorney, Agent, or Firm* — McDonald Hopkins LLC

(57) ABSTRACT

A faucet base with a light-emitting lamp includes a faucet base main body, an annular light-emitting lamp body, and a lampshade. The faucet base main body includes an annular base body, an annular lamp cavity, an external threaded connector, an internal threaded cavity provided within a lower end of the faucet base main body, and a cord groove. The annular light-emitting lamp body includes a circuit board, a light emitter, and a power cord. The lampshade includes an annular top plate, an inner annular wall plate, an outer annular wall plate, an annular light emitter cavity, and an encapsulation cavity. The annular light-emitting lamp body is embedded into the annular light emitter cavity, and the encapsulation cavity is filled with an encapsulation adhesive to fix the annular light-emitting lamp body; and the power cord extends into an axial hole of the annular base body through the cord groove.

13 Claims, 3 Drawing Sheets

FAUCET BASE WITH A LIGHT-EMITTING LAMP AND FAUCET

CROSS-REFERENCE TO RELATED APPLICATION

This application claims priority to Chinese Patent Application No. 202422671208.8 filed Nov. 1, 2024, the disclosure of which is incorporated herein by reference in its entirety.

TECHNICAL FIELD

The present disclosure relates to a faucet and, for example, a faucet base.

BACKGROUND

Currently, in the related art, Chinese Patent (application No. 201921738865.2) discloses a stainless steel kitchen sink faucet, which relates to the technical field of faucets. The faucet includes a main body. The bottom of the main body is connected to a base. The bottom of the base is connected to a threaded pipe. A threaded sleeve is connected to the outer side of the threaded pipe. A top end within the main body is provided with a valve core. A pressing cover is threadedly connected between an outer top end of the valve core and the main body. A top portion of the valve core is connected to a hand cover by an inner hexagon pointed set screw. In the present disclosure, the bottom of a water pipe communicates with an inclined pipe, and an activated carbon core is disposed within the inclined pipe. When the valve core is opened, a partition blocks a water flow, allowing the water to pass through the activated carbon core within the inclined pipe before the water flows out. Since activated carbon has a strong adsorption property, the activated carbon core can effectively remove odors from the water when the water passes through the activated carbon core, thereby making the discharged water healthier. In addition, a tail end of the inclined pipe is threadedly connected to a plug, and the plug can be unscrewed to facilitate replacement of the activated carbon core within the inclined pipe. However, in the related art, the faucet is not provided with a light emitter, which makes it inconvenient to use.

SUMMARY

An object of the present disclosure is to provide a faucet base with a light-emitting lamp. The faucet base has a light-emitting lamp body and is convenient to assemble.

To achieve the object, the present disclosure provides a faucet base with a light-emitting lamp. The faucet base with a light-emitting lamp includes a faucet base main body, an annular light-emitting lamp body, and a lampshade.

The faucet base main body includes an annular base body, an annular lamp cavity, an external threaded connector, an internal threaded cavity provided within a lower end of the faucet base main body, and a cord groove.

The annular light-emitting lamp body includes a circuit board, a light emitter, and a power cord.

The lampshade includes an annular top plate, an inner annular wall plate, an outer annular wall plate, an annular light emitter cavity, and an encapsulation cavity.

The annular light-emitting lamp body is embedded into the annular light emitter cavity, and the encapsulation cavity is filled with an encapsulation adhesive to fix the annular light-emitting lamp body; the inner annular wall plate of the lampshade and the outer annular wall plate of the lampshade are inserted into the annular lamp cavity, the annular top plate of the lampshade is fitted and sealed with an upper end of the annular base body, and the power cord extends into an axial hole of the annular base body through the cord groove.

In an embodiment, the light emitter is a light-emitting diode (LED) lamp bead.

In an embodiment, the inner annular wall plate of the lampshade is formed with an axial cord groove and a radial cord groove; and the power cord is configured to pass from the encapsulation cavity through the radial cord groove and the axial cord groove into the cord groove.

In an embodiment, a lower end surface of the annular base body is formed with an annular cushion groove.

In an embodiment, the faucet base main body is made of stainless steel or copper.

The present disclosure provides a faucet. The faucet includes a faucet main body and the preceding faucet base with a light-emitting lamp.

The external threaded connector is screwed into the internal threaded cavity of the faucet main body, and an inner annular wall plate of the annular lamp cavity supports a lower end of the faucet main body.

In the faucet base with a light-emitting lamp provided in the present disclosure, the annular light-emitting lamp body is configured to surround the bottom of the faucet and does not affect the installation of the faucet on a countertop or a sink.

DETAILED DESCRIPTION

Figure 1:
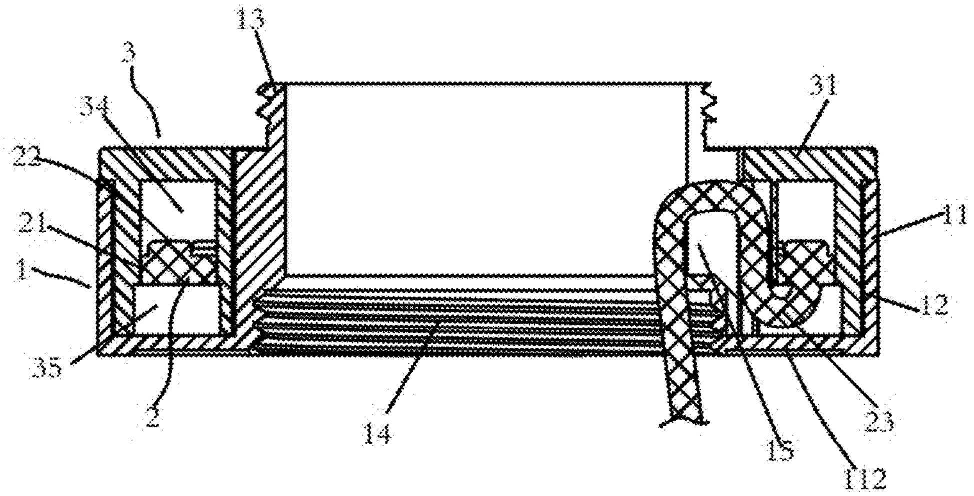
FIG. 1 is a cross-sectional view according to the present disclosure.
Figure 2:
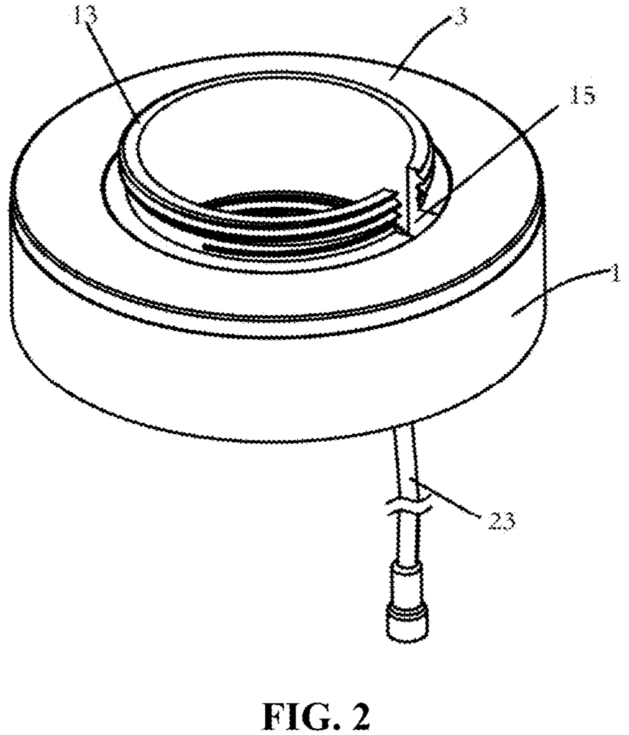
FIG. 2 is a perspective view according to the present disclosure.
Figure 3:
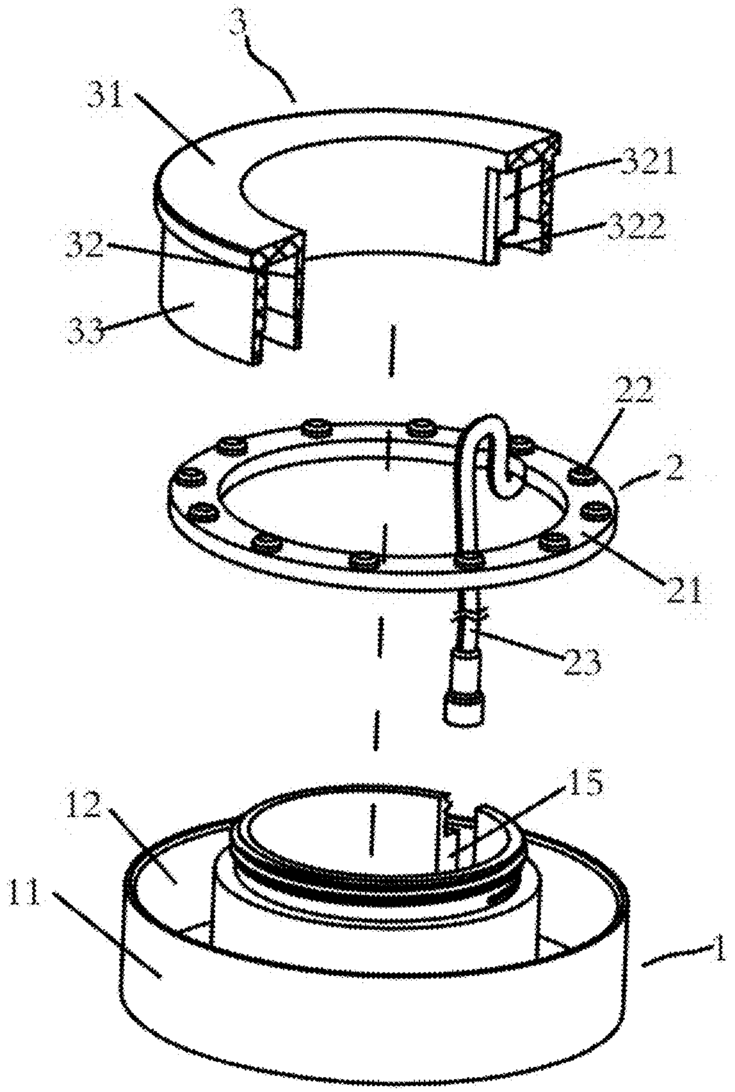
FIG. 3 is a first exploded perspective view according to the present disclosure.
Figure 4:
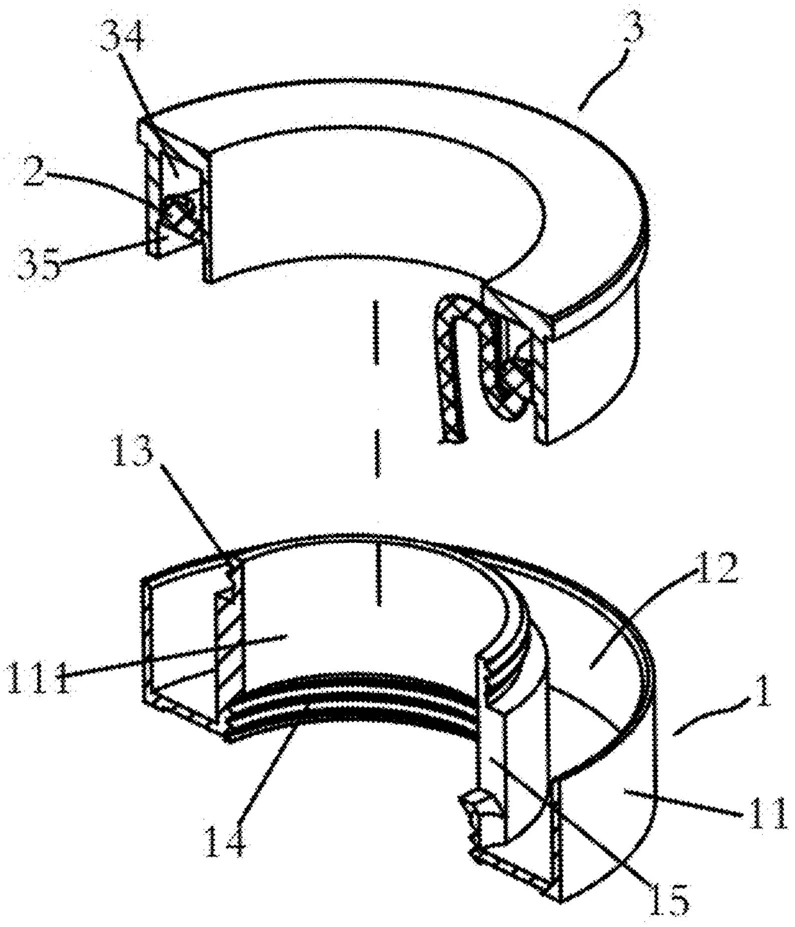
FIG. 4 is a second exploded perspective view according to the present disclosure.

Embodiments of the present disclosure are described in detail hereinafter. Examples of the embodiments are illustrated in the drawings, where the same or similar reference numerals indicate the same or similar elements or elements having the same or similar functions. The embodiments described below with reference to the drawings are illustrative, only for explaining the present disclosure, and not to be construed as limiting the present disclosure.

In the description of the present disclosure, it is to be understood that orientations or position relationships indicated by terms such as “center”, “above”, “below”, “front”, “rear”, “left”, “right”, “vertical”, “horizontal”, “top”, “bottom”, “inside”, and “outside” are based the drawings. These orientations or position relationships are intended to facilitate and simplify the description of the present disclosure, and are not to indicate or imply that a referred apparatus or element must have a specific orientation and must be constructed and operated in a specific orientation. Therefore, these orientations or position relationships are not to be construed as limiting the present disclosure. Moreover, terms such as “first” and “second” are used only for the purpose of description and are not to be construed as indicating or implying relative importance or implicitly indicating the number of technical features indicated. Thus, a feature defined as a “first” feature or a “second” feature may explicitly or implicitly include one or more of such features. In the description of the present disclosure, unless otherwise noted, "multiple" means two or more.

In the description of the present disclosure, it is to be noted that, unless otherwise expressly specified and limited, the term "installed", "connected to each other", or "connected" is to be construed in a broad sense, for example, as securely connected, detachably connected, or integrally connected; directly connected to each other or indirectly connected to each other via an intermediary; or connected within two elements. For those of ordinary skill in the art, specific meanings of the preceding terms in the present disclosure may be understood based on specific situations.

Embodiment 1

As shown in FIG. 1, a faucet base with a light-emitting lamp includes a faucet base main body 1, an annular light-emitting lamp body 2, and a lampshade 3.

The faucet base main body 1 includes an annular base body 11, an annular lamp cavity 12, an external threaded connector 13, an internal threaded cavity 14 provided within a lower end of the faucet base main body 1, and a cord groove 15. The annular lamp cavity 12 is provided on the annular base body 11 and has an upper opening. The external threaded connector 13 is provided at an upper end of an inner annular wall plate of the annular lamp cavity 12, and has a diameter smaller than the outer diameter of the inner annular wall plate. The cord groove 15 penetrates through the inner annular wall plate and the external threaded connector 13.

The annular light-emitting lamp body 2 includes a circuit board 21, a light emitter 22, and a power cord 23.

The lampshade 3 includes an annular top plate 31, an inner annular wall plate 32, an outer annular wall plate 33, an annular light emitter cavity 34, and an encapsulation cavity 35.

The annular light-emitting lamp body 2 is embedded into the annular light emitter cavity 34, and the encapsulation cavity 35 is filled with an encapsulation adhesive to fix the annular light-emitting lamp body 2. The inner annular wall plate 32 of the lampshade 3 and the outer annular wall plate 33 of the lampshade 3 are inserted into the annular lamp cavity 12, and the annular top plate 31 of the lampshade 3 is fitted and sealed with an upper end of the annular base body 11. The power cord 23 extends into an axial hole 111 of the annular base body 11 through the cord groove 15. The annular light emitter cavity 34 and the encapsulation cavity 35 are disposed, and the encapsulation cavity 35 is filled with the encapsulation adhesive, so as to provide waterproofing.

As a further improvement for the present disclosure, the light emitter 22 is an LED lamp bead.

As a further improvement for the present disclosure, the inner annular wall plate 32 of the lampshade 3 is formed with an axial cord groove 321 and a radial cord groove 322, and the power cord 23 passes from the encapsulation cavity 35 through the radial cord groove 322 and the axial cord groove 321 into the cord groove 15.

As a further improvement for the present disclosure, a lower end surface of the annular base body 11 is formed with an annular cushion groove 112.

As a further improvement for the present disclosure, the faucet base main body 1 is made of stainless steel or copper.

Embodiment 2

A faucet includes a faucet main body and the preceding faucet base with a light-emitting lamp.

The external threaded connector 13 is screwed into the internal threaded cavity at a lower end of the faucet main body 1, and the inner annular wall plate of the annular lamp cavity 12 supports the lower end of the faucet main body.

In the description of the specification, the description of reference terms, such as "an embodiment", "some embodiments", "illustrative embodiment", "example", "specific example", and "some examples", mean that features, structures, materials, or characteristics described in conjunction with the embodiment or the example are included in at least one embodiment or example of the present disclosure. In the specification, the illustrative description of these terms does not necessarily refer to the same embodiment or example. Moreover, the described features, structures, materials, or characteristics may be combined in an appropriate manner in one or more embodiments or examples.

Although the embodiments of the present disclosure have been shown and described, those of ordinary skill in the art can understand that various changes, modifications, substitutions, and alterations may be made to these embodiments without departing from the principles and spirit of the present disclosure, and the scope of the present disclosure is defined by the claims and equivalents thereof.

What is claimed is:

1. A faucet base with a light-emitting lamp, comprising: a faucet base main body, an annular light-emitting lamp body, and a lampshade, wherein the faucet base main body comprises an annular base body, an annular lamp cavity, an external threaded connector, an internal threaded cavity provided within a lower end of the faucet base main body, and a cord groove;

wherein the annular light-emitting lamp body comprises a circuit board, a light emitter, and a power cord;

wherein the lampshade comprises an annular top plate, an inner annular wall plate, an outer annular wall plate, an annular light emitter cavity, and an encapsulation cavity; and wherein the annular light-emitting lamp body is embedded into the annular light emitter cavity, and the encapsulation cavity is filled with an encapsulation adhesive to fix the annular light-emitting lamp body; the inner annular wall plate of the lampshade and the outer annular wall plate of the lampshade are inserted into the annular lamp cavity, the annular top plate of the lampshade is fitted and sealed with an upper end of the annular base body, and the power cord extends into an axial hole of the annular base body through the cord groove.

2. The faucet base with a light-emitting lamp of claim 1, wherein the light emitter is a light-emitting diode (LED) lamp bead.

3. The faucet base with a light-emitting lamp of claim 1, wherein the inner annular wall plate of the lampshade is formed with an axial cord groove and a radial cord groove; and the power cord is configured to pass from the encapsulation cavity through the radial cord groove and the axial cord groove into the cord groove.

4. The faucet base with a light-emitting lamp of claim 1, wherein a lower end surface of the annular base body is formed with an annular cushion groove.

5. A faucet base with a light-emitting lamp, comprising: a faucet base main body, an annular light-emitting lamp body, and a lampshade, wherein the faucet base main body comprises an annular base body, an annular lamp cavity, an external threaded connector, an internal threaded cavity provided within a lower end of the faucet base main body, and a cord groove;

wherein the annular light-emitting lamp body comprises a circuit board, a light emitter, and a power cord;

wherein the lampshade comprises an annular top plate, an inner annular wall plate, an outer annular wall plate, an annular light emitter cavity, and an encapsulation cavity;

wherein the annular light-emitting lamp body is embedded into the annular light emitter cavity, and the encapsulation cavity is filled with an encapsulation adhesive to fix the annular light-emitting lamp body; the inner annular wall plate of the lampshade and the outer annular wall plate of the lampshade are inserted into the annular lamp cavity, the annular top plate of the lampshade is fitted and sealed with an upper end of the annular base body, and the power cord extends into an axial hole of the annular base body through the cord groove; and wherein the faucet base main body is made of stainless steel or copper.

6. The faucet base with a light-emitting lamp of claim 5, wherein the light emitter is a light-emitting diode (LED) lamp bead.

7. The faucet base with a light-emitting lamp of claim 5, wherein the inner annular wall plate of the lampshade is formed with an axial cord groove and a radial cord groove; and the power cord is configured to pass from the encapsulation cavity through the radial cord groove and the axial cord groove into the cord groove.

8. The faucet base with a light-emitting lamp of claim 5, wherein a lower end surface of the annular base body is formed with an annular cushion groove.

9. A faucet, comprising: a faucet main body and a faucet base with a light-emitting lamp, wherein the faucet base with a light-emitting lamp comprises: a faucet base main body, an annular light-emitting lamp body, and a lampshade, wherein the faucet base main body comprises an annular base body, an annular lamp cavity, an external threaded connector, an internal threaded cavity provided within a lower end of the faucet base main body, and a cord groove;

wherein the annular light-emitting lamp body comprises a circuit board, a light emitter, and a power cord;

wherein the lampshade comprises an annular top plate, an inner annular wall plate, an outer annular wall plate, an annular light emitter cavity, and an encapsulation cavity;

wherein the annular light-emitting lamp body is embedded into the annular light emitter cavity, and the encapsulation cavity is filled with an encapsulation adhesive to fix the annular light-emitting lamp body; the inner annular wall plate of the lampshade and the outer annular wall plate of the lampshade are inserted into the annular lamp cavity, the annular top plate of the lampshade is fitted and sealed with an upper end of the annular base body, and the power cord extends into an axial hole of the annular base body through the cord groove; and wherein the external threaded connector is screwed into the internal threaded cavity of the faucet main body, and an inner annular wall plate of the annular lamp cavity supports a lower end of the faucet main body.

10. The faucet of claim 9, wherein the light emitter is a light-emitting diode (LED) lamp bead.

11. The faucet of claim 9, wherein the inner annular wall plate of the lampshade is formed with an axial cord groove and a radial cord groove; and the power cord is configured to pass from the encapsulation cavity through the radial cord groove and the axial cord groove into the cord groove.

12. The faucet of claim 9, wherein a lower end surface of the annular base body is formed with an annular cushion groove.

13. The faucet of claim 9, wherein the faucet base main body is made of stainless steel or copper.

* * * * *